United States Patent
Hayman et al.

(10) Patent No.: US 7,242,194 B2
(45) Date of Patent: Jul. 10, 2007

(54) FORMATION IMAGING WHILE DRILLING IN NON-CONDUCTIVE FLUIDS

(75) Inventors: Andrew J. Hayman, Brettonneux (FR); Philip Cheung, Montesson (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 39 days.

(21) Appl. No.: 10/844,173

(22) Filed: May 12, 2004

(65) Prior Publication Data
US 2004/0245991 A1 Dec. 9, 2004

Related U.S. Application Data

(63) Continuation-in-part of application No. 10/240,639, filed as application No. PCT/EP01/03718 on Mar. 29, 2001, now Pat. No. 6,891,377.

(51) Int. Cl.
*G01V 3/18* (2006.01)
(52) U.S. Cl. .................... 324/374; 324/367
(58) Field of Classification Search .......... 324/366, 324/367, 371, 374, 347, 355, 373, 375; 702/7, 702/11
See application file for complete search history.

(56) References Cited

U.S. PATENT DOCUMENTS

| | | | | |
|---|---|---|---|---|
| 2,712,629 | A | * | 7/1955 | Doll .......................... 324/374 |
| 2,961,600 | A | * | 11/1960 | Tanguy .................... 324/374 |
| 3,017,566 | A | * | 1/1962 | Schuster ................... 324/374 |
| 3,132,298 | A | * | 5/1964 | Dumanoir et al. ......... 324/374 |
| 3,462,678 | A | | 8/1969 | Eaton |
| 3,818,324 | A | * | 6/1974 | Espinasse ................. 324/374 |
| 3,973,181 | A | | 8/1976 | Calvert |
| 4,361,808 | A | * | 11/1982 | Kern et al. ............... 324/366 |
| 4,468,623 | A | | 8/1984 | Gianzero et al. |
| 4,511,842 | A | * | 4/1985 | Moran et al. ............. 324/338 |
| 4,567,759 | A | | 2/1986 | Ekstrom et al. |
| 4,738,812 | A | | 4/1988 | Raynal |
| 4,962,707 | A | | 10/1990 | Claussen |
| 5,235,285 | A | | 8/1993 | Clark et al. |
| 5,339,037 | A | | 8/1994 | Bonner et al. |

(Continued)

FOREIGN PATENT DOCUMENTS

GB 2 130 379 A 5/1984

(Continued)

*Primary Examiner*—Jay M. Patidar
(74) *Attorney, Agent, or Firm*—Bryan L. White; Kevin P. McEnaney; Dale V. Gaudier

(57) ABSTRACT

A resistivity tool for investigating a wall of a borehole drilled with a non-conductive mud includes a tool body adapted to be incorporated in a logging-while-drilling tool assembly; a resistivity sensor disposed on the tool body, wherein the resistivity sensor comprises a sensor pad supporting a current injector electrode, a current return electrode, and an array of measurement electrodes, and a circuitry for controlling current injection from the current injector electrode and for measuring voltage difference between electrodes in the array of measurement electrodes, wherein the current injector electrode and the current return electrode are disposed near opposite ends of the sensor pad and the array of measurement electrodes is disposed between the current injector electrode and the current return electrode, wherein the sensor pad is constructed of an insulating material and includes a conductive shielding member, or wherein the sensor pad is constructed of a conducting material and includes insulating sections around the electrodes.

20 Claims, 12 Drawing Sheets

(A)

U.S. PATENT DOCUMENTS

| | | |
|---|---|---|
| 6,173,793 B1 | 1/2001 | Thompson et al. |
| 6,191,588 B1 | 2/2001 | Chen |
| 6,230,557 B1 | 5/2001 | Ciglenec et al. |
| 6,564,883 B2 | 5/2003 | Fredericks et al. |
| 6,600,321 B2 | 7/2003 | Evans |
| 2002/0062992 A1 | 5/2002 | Fredericks et al. |
| 2003/0173968 A1 | 9/2003 | Cheung et al. |
| 2003/0222651 A1 | 12/2003 | Tabanou |

FOREIGN PATENT DOCUMENTS

| | | |
|---|---|---|
| GB | 2 391 070 | 1/2004 |
| GB | 2 401 185 | 11/2004 |
| WO | WO 01/77710 A1 | 10/2001 |
| WO | WO 01/77711 A1 | 10/2001 |

* cited by examiner (A)

(B)

FORMATION IMAGING WHILE DRILLING IN NON-CONDUCTIVE FLUIDS

CROSS-REFERENCE TO RELATED APPLICATIONS

This is a Continuation-In-Part of U.S. patent application Ser. No. 10/240,639, "Logging Sonde For Electrically Exploring Geological Formations Through Which A Borehole Passes," filed on Mar. 4, 2003 now U.S. Pat. No. 6,891,377 by Cheung et al., which claims priority from PCT Application PCT/EP01/03718 filed on Mar. 29, 2001 and claims priority from French Application No. FR20000004527 filed on Apr. 7, 2000.

BACKGROUND OF INVENTION

1. Field of the Invention

The invention relates generally to well logging using a resistivity tool; more particularly, it relates to resistivity logging while drilling in a well drilled with a nonconductive mud.

2. Background Art

In general terms, in order to explore hydrocarbon deposits, it is highly desirable to obtain accurate knowledge of the characteristics of the geological formation at various depths of the borehole. Many of these characteristics are very fine in structure, e.g. stratifications, non-uniform elements, pore characteristics, breaks, etc. By way of example, the orientations, the density, and the lengths of breaks play a major role in the dynamic characteristics of a reservoir rock.

For many years, it has been possible to determine such fine characteristics only by analyzing drill cores taken when drilling the borehole. However the taking of such cores is a technique that is extremely expensive, and use thereof remains relatively exceptional.

Patent EP-0 110 750, or corresponding U.S. Pat. No. 4,567,759, issued to Ekstrom et al., describes a technique of producing an image of the wall of a borehole which consists in generating characteristic signals at regular time intervals representative of a measurement with high spatial resolution of some characteristic of the wall, measuring the depth of the hole to which the characteristic signals relate with accuracy of the same order as the spatial resolution of the characteristic signals, and converting the signals representing the characteristic as a linear function of borehole depth with a color scale being associated with the values of the converted signals in order to form a visual image.

That imaging technique is implemented more particularly with a tool for investigating the conductivity of the formation, as described for example in patent EP-0 071 540, or its corresponding U.S. Pat. No. 4,468,623, issued to Gianzero et al., that is capable of detecting characteristics with millimeter resolution. That type of tool has a series of control electrodes, also known as "buttons", placed on a conductive pad pressed against the wall of the borehole. A constant current source applies voltage to each button and the conductive surface of the pad so that measurement currents are injected into the formation perpendicularly to the wall. A return is provided for the current by means of an electrode situated close to the surface, or possibly on another part of the tool. The pad is moved along the borehole and the discrete currents associated with each button are proportional to the conductivity of the material facing the buttons.

In application of the teaching of patent U.S. Pat. No. 4,567,759, issued to Ekstrom et al., the signals are modified by eliminating effects such as variations in the speed of the tool and disturbances due to variations in the environment of the tool as amplified and displayed in a manner which comes close to providing a visual image of the inside of the hole.
p That imaging technique has been highly successful over the last few years when used in boreholes drilled with conductive drilling mud such as water-base mud or mud of the oil-in-water emulsion type. However, with muds having a continuous non-conductive phase, such as oil-base muds or water-in-oil emulsion type muds, the images obtained are of very poor quality. These poor results are generally attributed to interference due to the presence of a layer of non-conductive mud, or of a layer of mud and a mud cake, interposed between the buttons and the formation under test. Since the thickness of the layer of mud varies in particular as a function of the roughness of the wall, the variations in the resulting currents can completely mask any current variations due to the formation being measured.

Other techniques address measurements in non-conductive mud, among which patent U.S. Pat. No. 6,191,588 discloses a tool for investigating formation conductivity uses a non-conductive pad and buttons that form voltage electrodes instead of current electrodes as described in U.S. Pat. No. 4,468,623. The current injection electrodes are situated off the pad, or in a preferred variant, directly at the ends thereof. In any event, the two injectors are placed in such a manner that current passes through the formation substantially parallel to the pad and thus preferably flows substantially orthogonally to the boundaries of the strata. Under such conditions, the potential difference between two buttons is proportional to the resistivity of the material facing the buttons.

The above-specified U.S. Pat. No. 6,191,588 recommends using DC, or AC at very low frequency, such that the resistivity of the pad is much grater than the resistivity of the drilling mud. However, in practice, working with DC gives rise to problems of noise due in particular to the formation of spontaneous potentials in the formation. In addition, the resistance of the mud limits the quantity of current injected; the potential differences measured between two pairs of buttons are thus very small and therefore difficult to measure.

It would therefore be desirable to be able to work with AC at a relatively high frequency, e.g. on the order of a few thousand hertz. Unfortunately, at such frequencies, the pad behaves like a dielectric whose effective conductivity is similar to that of the mud. This gives rise to an electrical impedance through the pad that is of the same order as the impedance through the layer of mud. Under such conditions, the potential differences between pairs of buttons are more representative of the potential difference applied between the current electrodes than they are of the resistivity of the formation facing them, therefore, the tool becomes unusable.

PCT Patent Application No. WO 01/77710 describes an improvement of the tool disclosed in U.S. Pat. No. 6,191,588 to make it possible to work with AC at frequencies higher than 1000 Hz. Therefore, this patent application provides a tool for investigating the wall of a borehole in a geological formation that comprises a non-conductive pad near the end of which are mounted an AC source electrode and a current return electrode and in the center of which is an array of pairs of voltage difference measurement electrode (dV). The resistivity of the formation opposite each pair of dV electrodes is calculated using:

$$\rho = k \cdot dV/I$$

where ρ is the resistivity, k is a geometrical factor, dV is the voltage difference between a pair of electrodes and I is the current in the formation.

To shield the dV electrodes from the electric field generated in the insulating pad and in the non-conducting fluid, a conducting backplate is included behind the insulating pad, parallel to the front face and covering most of the region between the current electrodes. In a particularly preferred variant of the invention, the electrically conductive portion of the pad is connected to ground, or more precisely it is placed at the same electrical potential as the geological formation. Under such conditions, the measurement electrodes do indeed measure the potential of the formation facing them even when the pad is inclined, i.e. when the "standoff" distance between the formation and the source electrodes is different from the standoff distance between the formation and the return electrode.

The major limitation of the measurement is that the pad must be close to the borehole wall, especially in low-resistivity formations. Otherwise, the dV measurement is sensitive to the electric field generated in the borehole fluid and pad rather than in the formation. For example, in a 0.1 Ω.m formation the maximum standoff is about 5 mm, while in a 100-Ω.m formation the maximum standoff is about 15 mm. As a result, when the borehole is rough the images are spoiled by incorrect readings and become uninterpretable.

To overcome this problem, one approach proposes improved methods of shielding the voltage measurement electrodes from the electric field generated in the pad by the current injectors. The shielding is flush with or almost flush with the outside face of the pad.

Due to these particular features, the apparatus according to the above approach allows for accurate resistivity measurements in non-conductive mud wells, even when the pad is not closely pressed against the formation wall, due to thick mudcake or rugosity of said wall. Due to the shielding means, the electrical field in the pad is eliminated or almost eliminated. In the mud between the pad and the borehole wall, the electrical field is also drastically reduced in the vicinity of the measurement electrodes such that electric equipotential curves in the mud remain almost perpendicular to the formation wall. Therefore, the potential at these measurement electrodes remains close to that in the formation.

In one embodiment, the pad itself constitutes the shielding means, said pad being made of electrically conductive material. In this case, electrically insulating inserts are arranged in the pad around each of the source, return and measurement electrodes.

In a second embodiment, the pad is made of electrically non conductive material and the shielding means comprise electrically conductive sheets that are arranged inside said pad such that said conductive sheets are almost flush with the outside face of said pad.

While the above-described tools are capable of providing images of boreholes drilled with non-conductive muds, they are wireline tools and are not suitable for logging-while-drilling applications. Therefore, a need exists for tools or methods for imaging a borehole while a borehole is being drilled with a non-conductive mud.

SUMMARY OF INVENTION

One aspect of the invention relates to a resistivity for investigating a wall of a borehole drilled with a non-conductive mud. A tool in accordance with one embodiment of the invention includes a tool body adapted to be incorporated in a logging-while-drilling tool assembly; a resistivity sensor disposed on the tool body, wherein the resistivity sensor comprises a sensor pad supporting a current injector electrode, a current return electrode, and an array of measurement electrodes; and a circuitry for controlling current injection from the current injector electrode and for measuring voltage difference between electrodes in the array of measurement electrodes, wherein the array of measurement electrodes is disposed between the current injector electrode and the current return electrode, wherein the sensor pad is constructed of an insulating material and includes a conductive member.

One aspect of the invention relates to a resistivity tool for investigating a wall of a borehole drilled with a non-conductive mud. A tool in accordance with one embodiment of the invention includes a tool body adapted to be incorporated in a logging-while-drilling tool assembly; a resistivity sensor disposed on the tool body, wherein the resistivity sensor comprises a sensor pad supporting a current injector electrode, a current return electrode, and an array of measurement electrodes; and a circuitry for controlling current injection from the current injector electrode and for measuring voltage difference between electrodes in the array of measurement electrodes, wherein the array of measurement electrodes is disposed between the current injector electrode and the current return electrode, wherein the sensor pad is constructed of conductive material and the electrodes are insulated from the conductive material.

Other aspects and advantages of the invention will be apparent from the following description and the appended claims.

DETAILED DESCRIPTION

Embodiments of the invention relate to apparatus and methods for formation imaging using resistivity logging while drilling in boreholes drilled with non-conductive fluids. A tool in accordance with embodiments of the invention may include sensors on the bottom-hole assembly that rotates with the drill string. Alternatively, a tool in accordance with embodiments of the invention may include sensors on non-rotating sleeves or pads that maintain contact with the borehole wall during drilling. In this description, oil-based muds (OBM) will be generally used to refer to non-conductive muds, including oil-based muds or water-in-oil emulsion muds.

A resistivity logging tool can be based on electrical dipoles (using generally metallic electrodes) or magnetic dipoles (using generally induction coils or resonant cavities at VHF). Embodiments of the invention relate to sensors or tools using metallic electrodes. A co-pending U.S. patent application Ser. No. 60/511467, entitled "Apparatus And Methods For Imaging Wells Drilled With Oil-Based Muds," by Tabanou et al. and assigned to the assignee of the present invention discloses tools and methods based on electric dipoles for borehole imaging in wells drilled with OBM. Another co-pending U.S. patent application Ser. No. 10/812369, entitled "Oil Base Mud Resistivity Imager, Dipmeter, And Fault Imager," by Homan et al. and assigned to the assignee of the present invention discloses tools and methods based on electromagnetic induction for borehole imaging in wells drilled with OBM.

Figure 5:
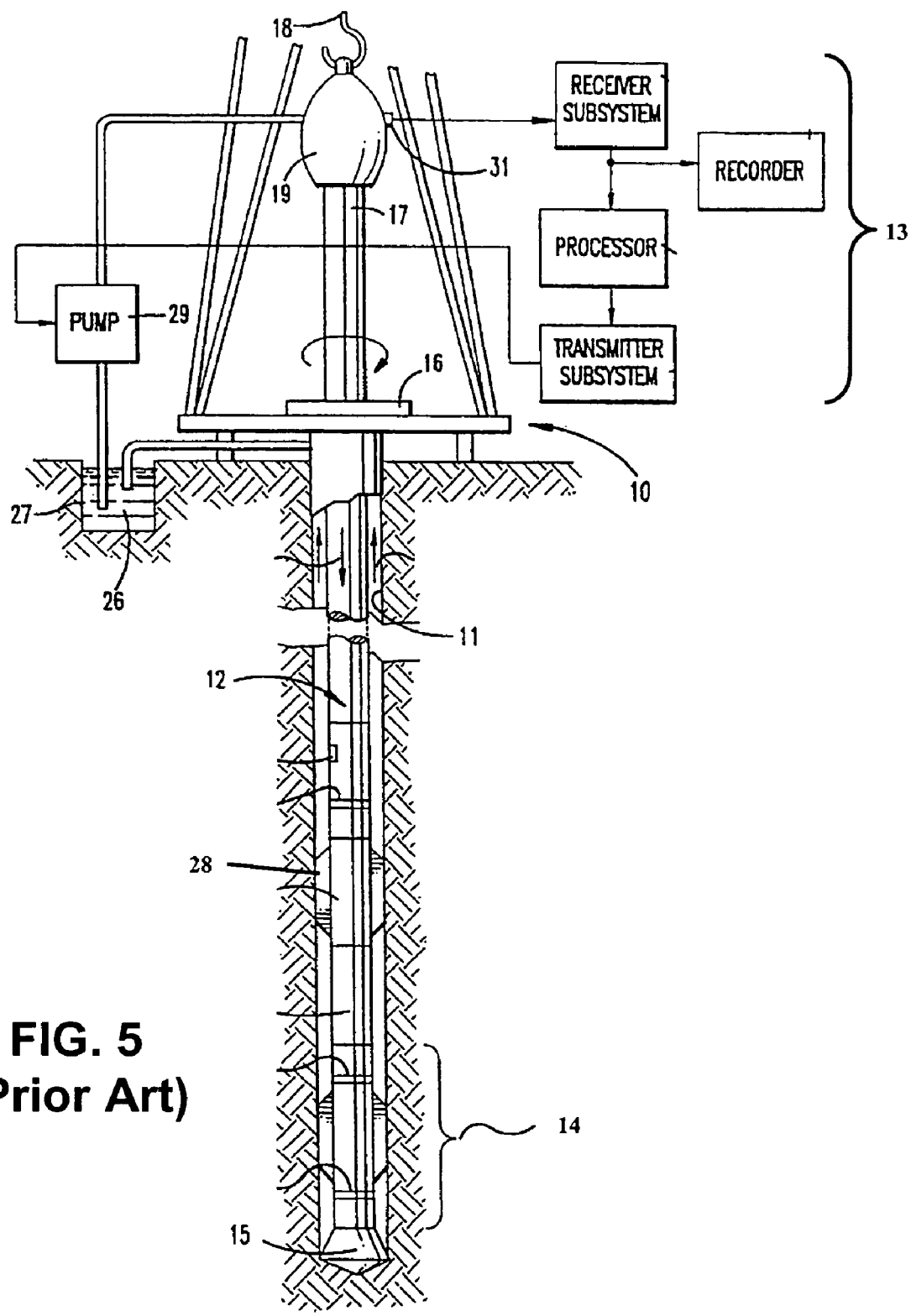
FIG. 5 shows a prior art drilling system.

FIG. 5 illustrates a system for logging-while-drilling (LWD) that may be used with embodiments of the present invention. As shown, a typical LWD system includes a derrick 10 positioned over a wellbore 11. A drilling tool assembly, which includes a drill string 12 and drill bit 15, is disposed in the wellbore 11. The drill string 12 and bit 15 are turned by rotation of a kelly 17 coupled to the upper end of the drill string 12. The kelly 17 is rotated by engagement with a rotary table 16 or the like forming part of the rig 10. The kelly 17 and drill string 12 are suspended by a hook 18 coupled to the kelly 17 by a rotatable swivel 19.

Drilling fluid is stored in a pit 7 and is pumped through the center of the drill string 12 by a mud pump 9 to flow downwardly. After circulation through the bit 15, the drilling fluid circulates upwardly through an annular space between the wellbore 11 and the outside of the drill string 12. Flow of the drilling mud lubricates and cools the bit 15 and lifts drill cuttings made by the bit 15 to the surface for collection and disposal.

As shown, a logging tool 14 is connected to the drill string 12. Signals measured by the logging tool 14 may be transmitted to the surface computer system 13 or stored on memories (not shown) onboard the tool 14. The logging tool 14 may include one or more resistivity sensors of the present invention for imaging the wellbore.

Alternatively, a sensor of the invention may be included on one or more pads, fins, or stabilizers (or centralizers) 28 that are similar to those used to reduce wobbling of the drill string during operation. A pad or stabilizer may or may not rotate with the drill string. If the pad or centralizer rotates with the drill string, one set of the sensors will be sufficient to provide the full bore image. If the pad or centralizer does not rotate with the drill string, then multiple sets of the sensors will be needed on the centralizer (or the ribs thereon) to provide more coverage of the borehole.

Whether incorporated on a rotating subassembly of a BHA or on a non-rotating sleeve, a sensor in accordance with the invention is based on a similar principle as that of the sensor disclosed in PCT/US99/14420 or U.S. Pat. No. 6,191,588 B1 issued to Chen. One such embodiment is shown in FIG. 1.

Figure 1:
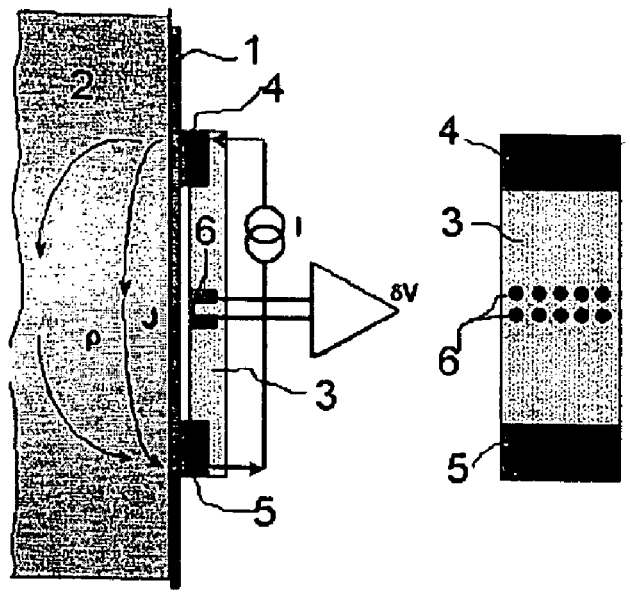
FIG. 1 is a diagram showing the principle on which micro-electrical measurement of the formation is based.

FIG. 1 is a diagram showing the principle on which electrical measurement is based in the imaging technique described in international patent application PCT/US99/14420. That tool is particularly adapted to investigating the wall 2 of a borehole drilled with a non-conductive drilling mud, for example a drilling fluid whose liquid phase is constituted essentially by an oil (diesel oil, synthetic oil) or by a water-in-oil emulsion. The term "oil-base mud" is used below to designate drilling fluids of either of those types. The drilling mud forms a mud cake 1 along the wall 2.

The tool for investigating the wall of a borehole has a pad 3 made of an electrically insulating material such as a ceramic or polymers having high strength and high thermal and chemical stability, in particular of the polyarylene ether ketone type (polyether ether ketone or PEEK).

The pad serves as a support for two current injectors: the source electrode 4 and the return electrode 5. These two electrodes are situated at opposite ends of the pad and occupy the entire width thereof, as can be seen more clearly in the front view of the pad, or at least they occupy a large fraction of its width, so as to maximize the surface areas of these current injection electrodes. The central portion of the pad has two rows of measurement electrodes 6, and in the case shown it has five pairs of measurement electrodes. The shape of the pad is such that the measurement electrodes 6 are set back slightly so that the measurement electrodes do not come directly into contact with the geological formation when the pad is pressed against the wall 2. It should be observed that this preferred shape is not essential when the rock is porous since under such circumstances, drilling with an oil-base mud causes a mud cake to be formed of resistivity that is greater than that of the geological formation, with this cake always being interposed between the measurement electrodes and the geological formation, thus preventing any of the measurement buttons being short circuited by coming into contact with the rock.

As shown in FIG. 1, the regions in the formation measured by the measurement electrodes are defined by the spacing between the two rows of the measurement electrodes. Therefore, the resolution of a borehole image produced by such a tool is determined by the electrode spacings. Embodiments of the invention may have measurement electrode spacings on the order of about 1 inch, ranging from about 0.2 inch to about 2 inches.

With DC or AC at a frequency of less than about 100 kHz, the resistivity of geological formations generally lies in the range 0.1 Ω·m to 10,000 Ω·m, whereas an oil-base mud has effective resistivity of about 0.1 MΩ·m to about 10 MΩ·m. Under such conditions, when a current i is injected into the formation by the injectors 4 and 5, with the measurement electrodes being insulated by the non-conductive pad, then in application of Ohms' law it is observed that the resistivity ρ of the formation situated beneath a pair of measurement electrodes is equal to the ratio of the potential difference δV between two electrodes over the current density J. In other words, the resistivity of the formation is obtained from the equation:

$$\rho = \delta V/J = k\ \delta V/I,$$

where k is a geometrical factor.

If the injected current is AC at a sufficiently high frequency (greater than about 1 kHz), the pad can no longer be considered as being a perfect electrical insulator, but must on the contrary be considered as being a dielectric immersed in a dielectric medium, namely the oil-base mud. With current at a frequency of about 10 kHz, for example, it suffices for the relative permittivity of the pad to be greater than 2 to have an impedance across the pad on the same order of magnitude as the impedance through the mud. The relative permittivity of polymers of the polyarylene ether ketone type is of the order of 3 which, compared with other common materials, is a small value. Changing the material is thus no solution.

Figure 2:
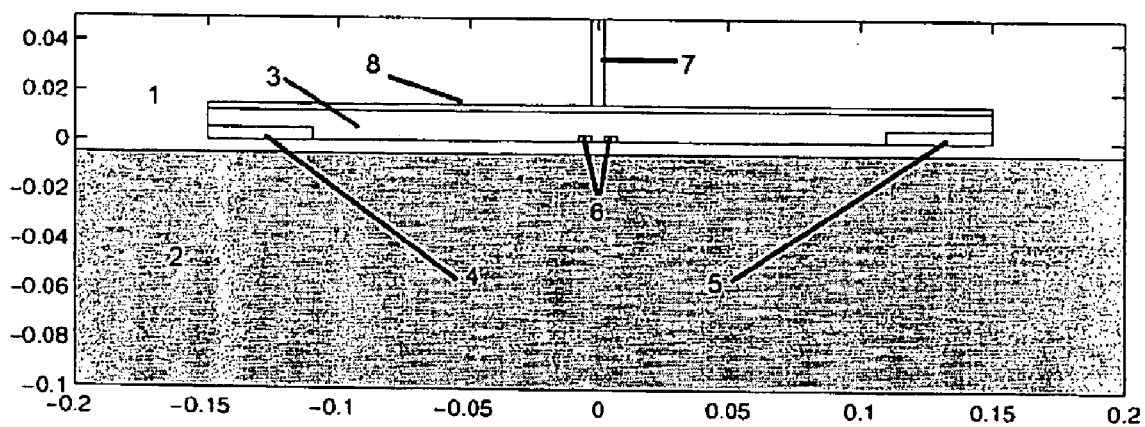
FIG. 2 shows the geometrical model used for simulating the electric fields in the geological formation.

To gain a better understanding of the effect of this dielectric behavior, the pad in contact with the formation has been modeled. The model used is shown in FIG. 2. The model includes a mud having a thickness of 5 mm deposited on a rock that is 1 m thick and 2 m long. The pad placed in the central portion of the model is itself modeled in the form of a rectangular body that is 300 mm long and 12.5 mm thick, with current injectors that are 40 mm long and 5 mm thick, and a pair of measurement electrodes, each being 5 mm long and 2.5 mm thick. The pad is connected to the remainder of the tool by a metal arm. This model ignores in particular the bundle of electric wires connecting the pad to the electronics unit for processing the signals.

The pads can also be provided with a conductive backplate made of metal, having potential that is "floating" or identical to that of the rock (grounded).

For current at 10 kHz, the conductivities of the materials in question are as follows:

|  | Conductivity ($\delta + jw\epsilon$ Sm$^{-1}$) | | |
| --- | --- | --- | --- |
|  | Real | Imaginary | $\epsilon_I$ |
| Mud | $1 \times 10^6$ | $2.81 \times 10^{-6}$ | 5 |
| Pad (PEEK) | 0 | $1.8 \times 10^{-6}$ | 3.2 |
| Rock (order of magnitude) | 10–0.0001 | $\sim 2 \times 10^6$ | ~3–15 |
| Metal Parts | $1 \times 10^6$ | 0 | — |

The oil-base mud under consideration is an emulsion of water-in-oil in a ratio of 10:90, the oil being a synthetic oil of the n-olefin type.

Figure 3A:
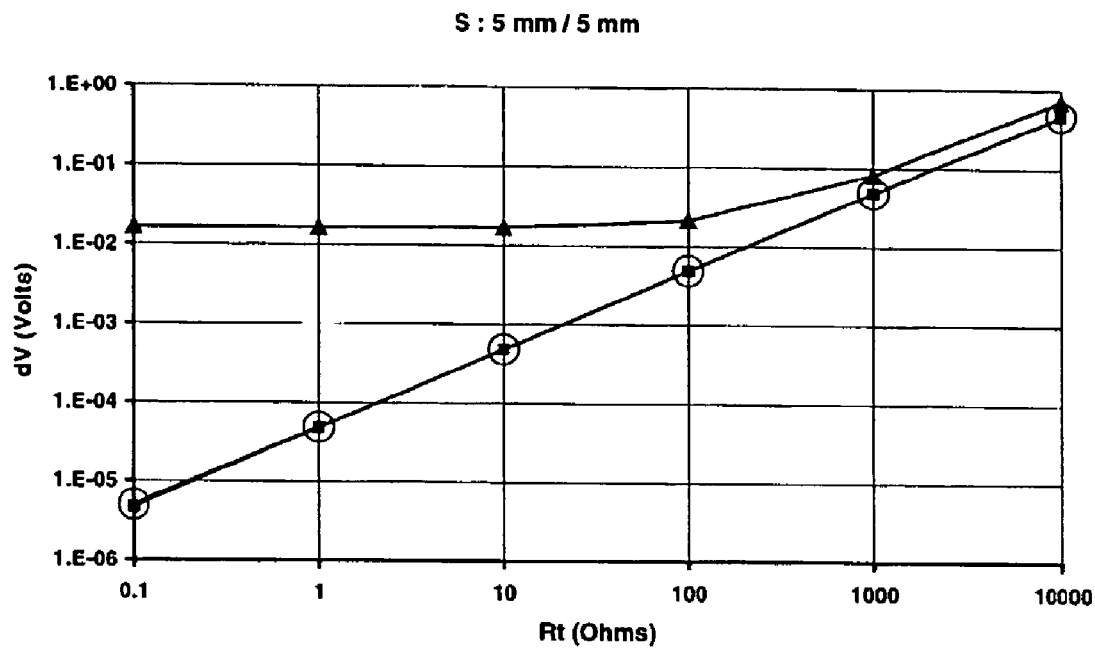
FIG. 3 comprises two graphs (FIGS. 3A and 3B) in which the values calculated as a function of the FIG. 2 model for potential difference between the measurement electrodes are plotted for a pad that is parallel to the wall (FIG. 3A or that is slightly inclined relative thereto (FIG. 3B).
Figure 3B:
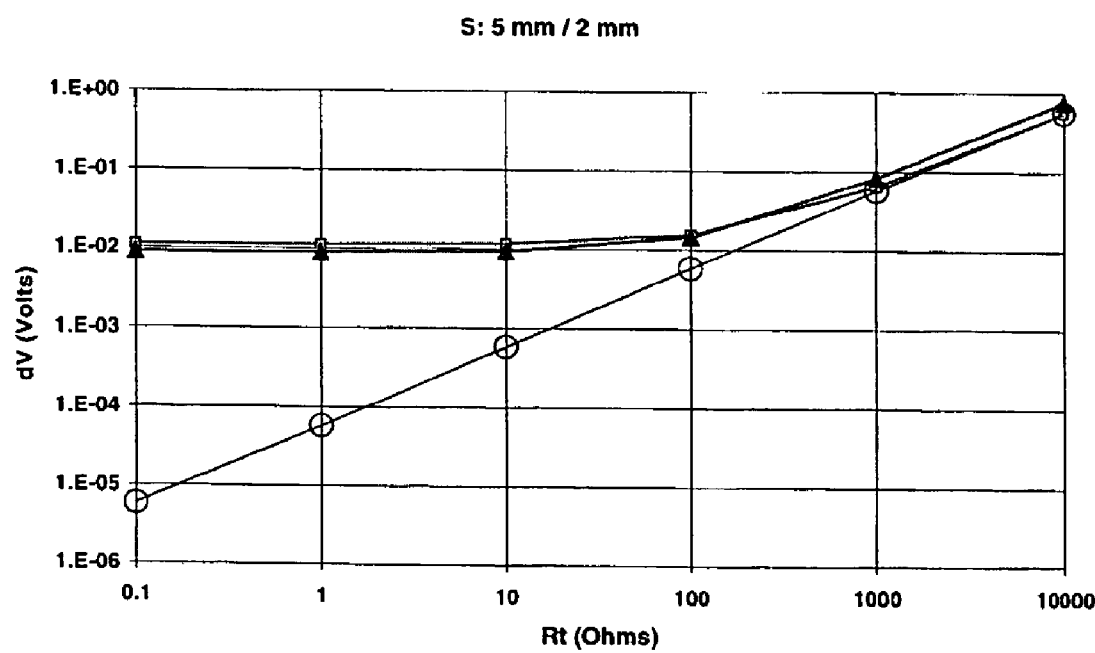

The values calculated from this model for the potential difference between the two measurement electrodes as a function of the resistivity Rt of the rock are plotted in FIG. 3, assuming that the pad is exactly parallel to the rock and is at a uniform "standoff" distance of 5 mm therefrom (FIG. 3A), or assuming that the pad is slightly inclined, with the standoff distance between the pad and the rock varying over the range 2 mm to 5 mm (FIG. 3B).

In the absence of a backplate (values represented by triangles), the signal is practically constant so long as the resistivity of the formation is less than about 100 Ω·m, so the tool is unusable if the frequency of the AC at the injectors is 10 kHz.

With a backplate at a potential that is left floating (values represented by squares), the potential difference between the measurement electrodes has the appearance of being directly proportion to the resistance of the rock when the pad is parallel to the rock. However, when the pad is tilted relative to the rock, then, as in the case of a pad without a backplate, the signal is practically constant for formations having a resistivity of less than 100 Ω·m. With a backplate connected to ground (i.e. a backplate whose potential is identical to that of the rock), corresponding to the points represented by circles, the signal is indeed characteristic of the resistivity of the formation, even if the pad is slightly tilted, as often occurs in a borehole.

Various means can thus be used to ground the back-plate. By way of example, the simplest way is to connect the plate to the logging tool which is itself connected to ground via the length of cable for which it is suspended, which cable might pass through several thousands of meters of formation.

Another solution is to estimate the potential of the formation by averaging, using an electronic circuit that averages the potential values measured by all of the pairs of measurement electrodes.

It is also possible to measure this potential directly, e.g. by means of additional electrodes, which are preferably large, surrounding the set of pairs of measurement electrodes, and then maintaining the backplate at said potential by means of an appropriate electronic circuit.

Figure 4:
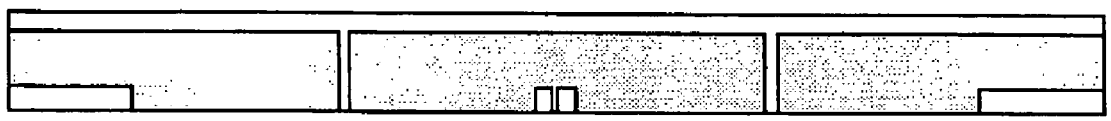
FIG. 4 shows a variant of the invention with a conductive plate subdividing the pad into compartments.

In a particularly preferred variant of the invention, shown diagrammatically in FIG. 4, the conductive backplate has appendices which isolate the measurement electrode zone from the end zones containing the injectors. With such a design, the minimum distance between the two injectors can be reduced by about 20% while maintaining a signal that is proportional to the resistivity of the geological formation.

To improve the shielding of the measurement electrodes from the current electrodes, one approach entails placing the shielding means closer to the outside face of the pad in the regions between the injectors and the measurement electrodes. Therefore, the shielding means will be placed flush or almost flush with the outside face of the pad. When doing this, the electrical field created in the pad is eliminated (see embodiment with conductive pad) or almost eliminated (see embodiment with non-conductive pad). Furthermore, this electrical field is almost eliminated between the outside face of the pad and the formation wall in the vicinity of the measurement electrodes. Therefore, the electrical equipotential curves in the mud are almost perpendicular to the borehole wall (and to the outside face of the pad) in the vicinity of the measurement electrodes, which ensures that the potential at said electrodes remains close to that in the formation.

A first embodiment consists of a conductive metallic pad structure that contains insulating inserts around the source and return electrodes and measurement electrodes. Therefore, in this embodiment of an apparatus according to the invention, it is the conductive pad itself that shields the measurement electrodes.

The conductive pad 90 is held at a potential close to that of the formation in front of the measurement electrodes. For example, in one preferred implementation the pad is driven at the measured potential of the formation in front of the measurement electrodes 6. As mentioned in the PCT Patent Application PCT/EP01/03718 A1, an electronic circuit, not shown, averages all the potential values measured by all the measurement electrodes.

A second embodiment consists of a pad made of insulating material and shielding means constituted of conducting (e.g., metallic) sheets. In order not to weaken the outside parts of the shielding sheets can be molded inside the pad. Alternatively, conductive sheets can be placed on both the inside face and the outside face of the pad.

Figure 6:
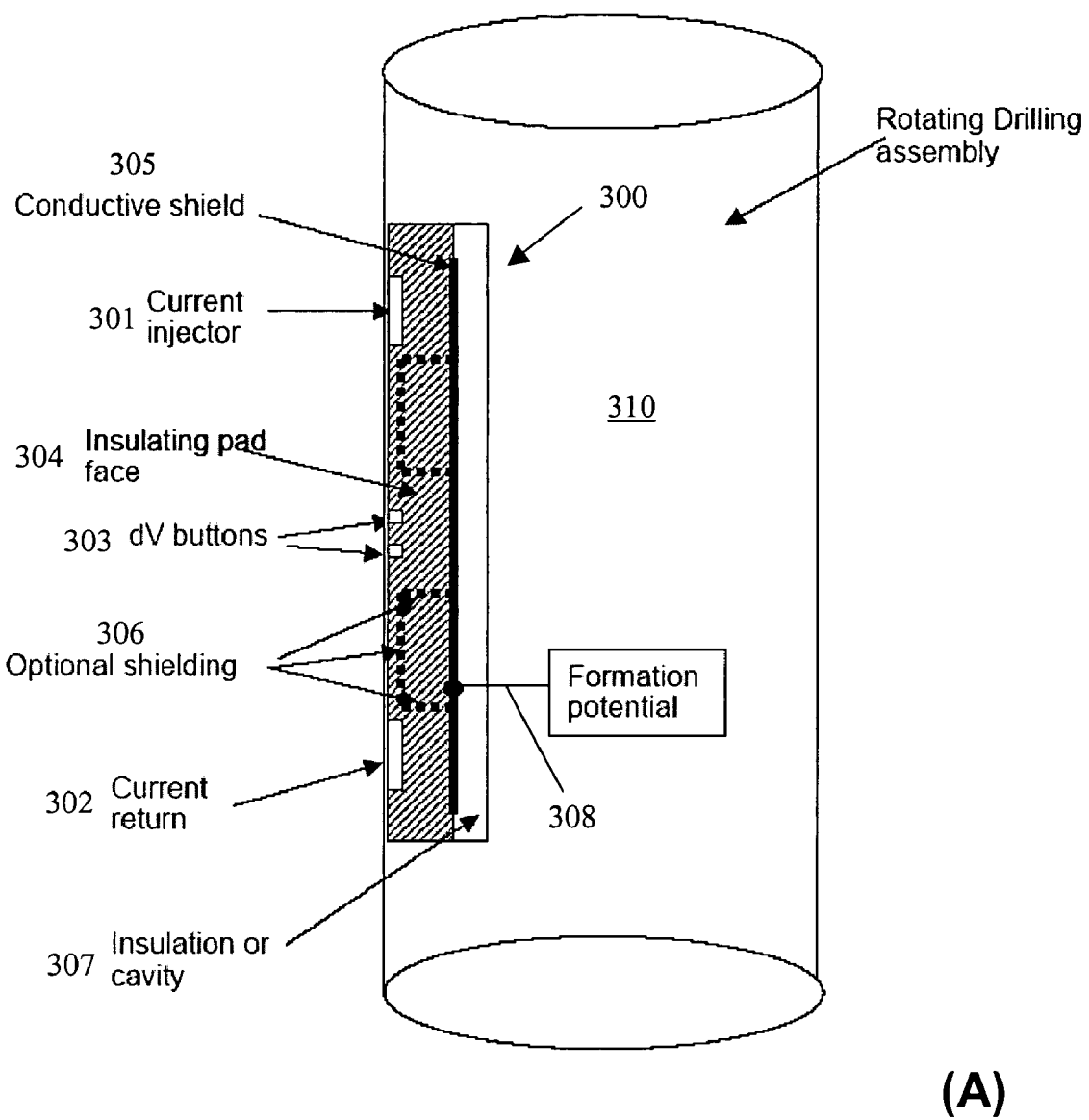
FIG. 6 shows a resistivity sensor having a conductive member in an insulating pad disposed on a tool body according to one embodiment of the invention.

FIG. 6 shows one embodiment of a sensor having an insulating face and a conductive backplate disposed on an LWD tool. As shown, a sensor 300 in accordance with one embodiment of the invention is disposed on a rotating drilling assembly 310. The sensor 300 comprises a current injection electrode 301, a current return electrode 302, and an array of measurement electrodes 303, all of which disposed on an insulating pad 304. In addition, a conductive shield (or conductive backplate) 305 is disposed behind the electrodes, but insulated from the conductive drilling assembly 310 by an insulation layer or cavity 307. The sensor 300 may optionally include shields 306 between the current injector electrode 301 and the measurement electrodes 303 and/or between the current return electrode 302 and the measurement electrodes 303. These conductive shields 305, 306 can reduce the potential induced in the insulating pad 304, making the measurements by the measurement electrodes more related to the formation resistivity, as shown in FIG. 3A and FIG. 3B.

In addition, the conductive shield (or conductive backplate) 305 may be "grounded" at the formation potential via a conductive link 308. As noted above with reference to FIG. 3B, maintaining the conductive shield (backplate) at a potential substantially identical to the potential of the formation reduces adverse effects due to unequal standoffs at the two ends of the sensor. One of ordinary skill in the art would appreciate that various ways may be used to maintain the conductive backplate potential close to or identical to the formation potential. As noted above, the backplate may be grounded to the drill string. In another approach, one may estimate or determine the potential of the formation potential and actively maintain the potential on the conductive backplate to be substantially the same as the formation potential. Alternatively, one may use a conductive link to allow the conductive backplate to indirectly "contact" the formation, i.e., passively grounding the conductive backplate. In this case, it is preferred that the formation "contact" point is close to the measurement electrodes so that the grounding potential at the conductive backplate is substantially the same as the formation potential in front of the measurement electrodes. The passive grounding approach is not practical with wireline tools because the borehole wall often has non-conductive mud cakes that insulate the formation. However, in LWD applications, the borehole is freshly drilled and little or no mud cake has formed on the borehole wall. Therefore, effective grounding may be achieved by simply contacting the borehole wall, and such contact can be made with greater force during drilling than during wireline logging.

Figure 7:
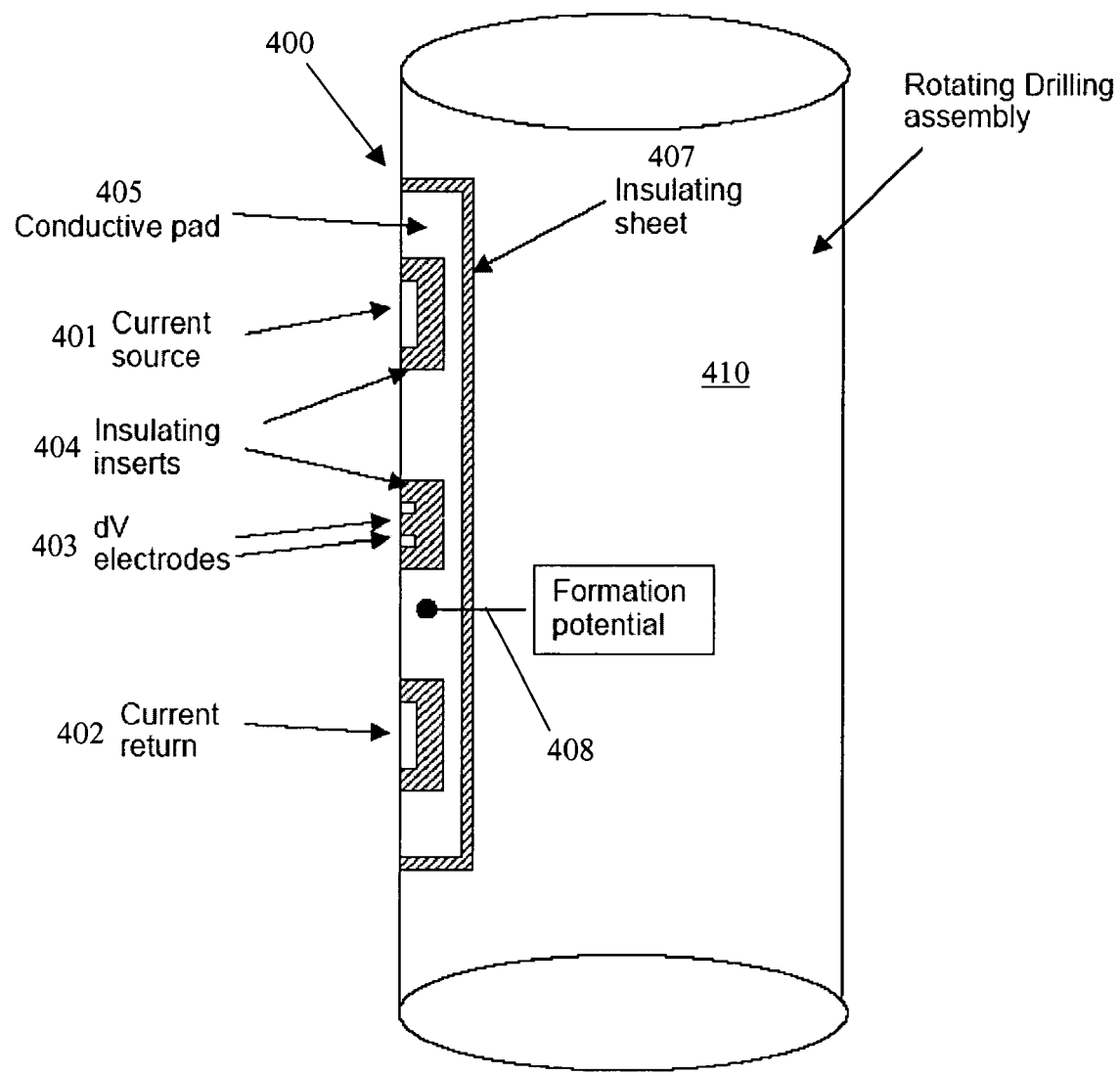
FIG. 7 shows a resistivity sensor having a conductive pad disposed on a tool body according to another embodiment of the invention.

For mechanical resistance in LWD environment, the preferred implementation uses a metallic pad. FIG. 7 shows a sensor according to another embodiment of the invention having sensors disposed on a metallic pad, but insulated from the metallic pad. In addition to providing mechanical strength, the metallic pad also functions as a conductive backplate described above. This configuration eliminates the need for a separate conductive backplate. As shown, the sensor 400 comprises a current injector electrode 401, a current return electrode 402, and an array of measurement electrodes 403, all of which disposed on a conductive pad 405. However, all these electrodes are insulated from the conductive pad 405 by the insulating inserts 404 surrounding the electrodes.

The sensor 400, together with its conductive pad 405, is placed in a cavity in a drilling assembly 410. The conductive pad 405 is insulated from the rest of the drilling assembly by an insulating sheet (or a layer of insulating material) 407 in the cavity. The conductive pad 405 may be "grounded" or maintained at a potential substantially the same as the formation potential via a conductive link 408, which may be connected to a circuitry that maintains a selected potential at the conductive pad 405 or passively grounding the conductive pad 405 to the formation.

Figure 8:
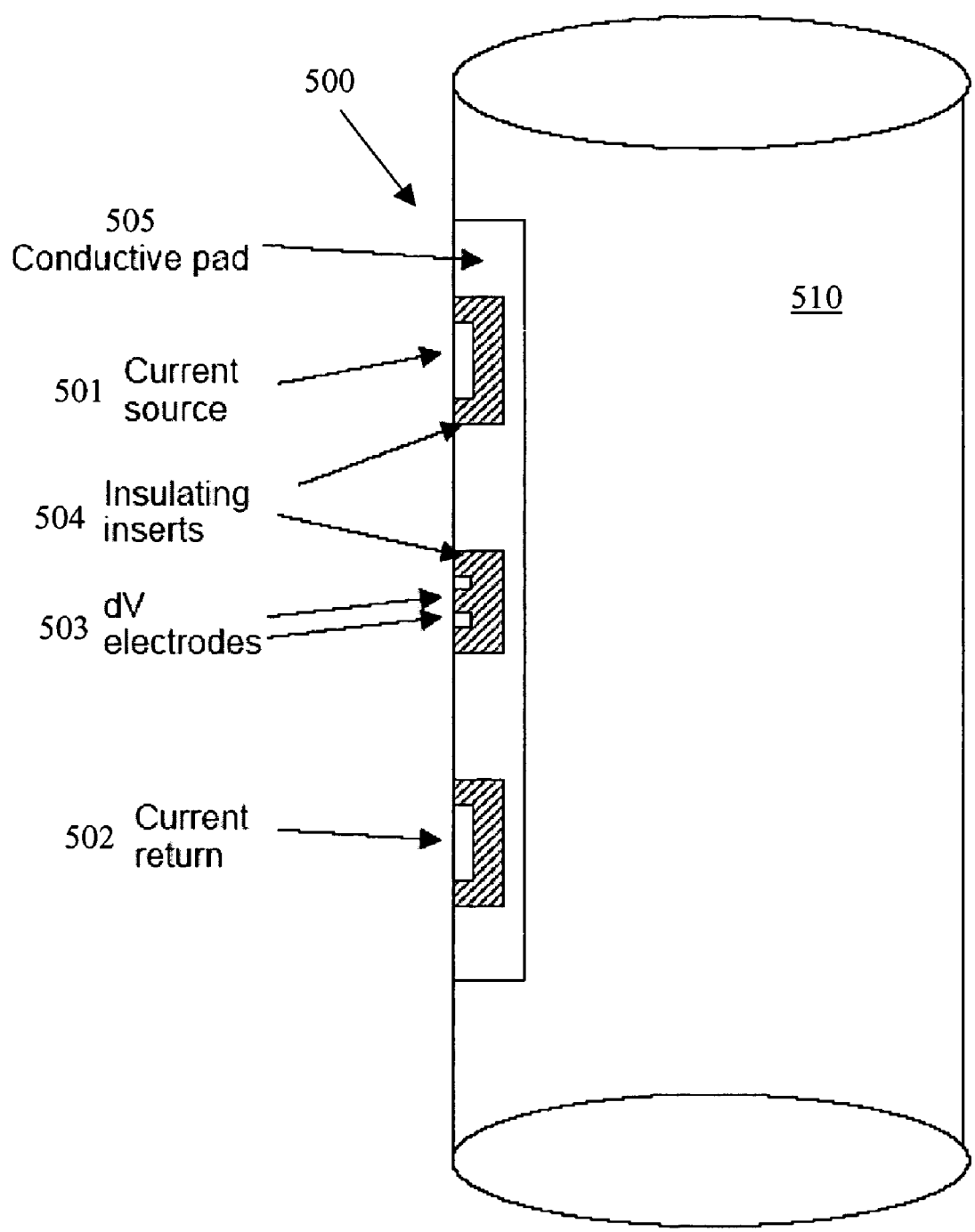
FIG. 8 shows a resistivity sensor having a conductive pad disposed on a tool body according to another embodiment of the invention.

FIG. 8 shows a variation of the sensor shown in FIG. 7. As shown, a sensor 500 comprises a current injection electrode 501, a current return electrode 502, and an array of measurement electrodes 503, all of which are disposed on a conductive pad 505, but insulated from the conductive pad 505 by the insulating inserts 504. The sensor 500 is placed in a cavity on the drilling assembly 510, without an insulating sheet. Therefore, the conductive pad 505 is electrically connected to the drilling assembly 510, and no conductive link is required for grounding the conductive pad 505.

The above examples illustrates sensors in accordance with embodiments of the invention. These sensors are insulated from the tool body or drill string. However, the backside of the sensors includes conductive members, which may be a conductive backplate in an insulating pad or a conductive pad itself. The conductive member is preferably maintained at a potential substantially the same as the formation potential in front of the measurement electrodes, or the conductive member is grounded to the formation near the measurement electrodes.

Figure 9:
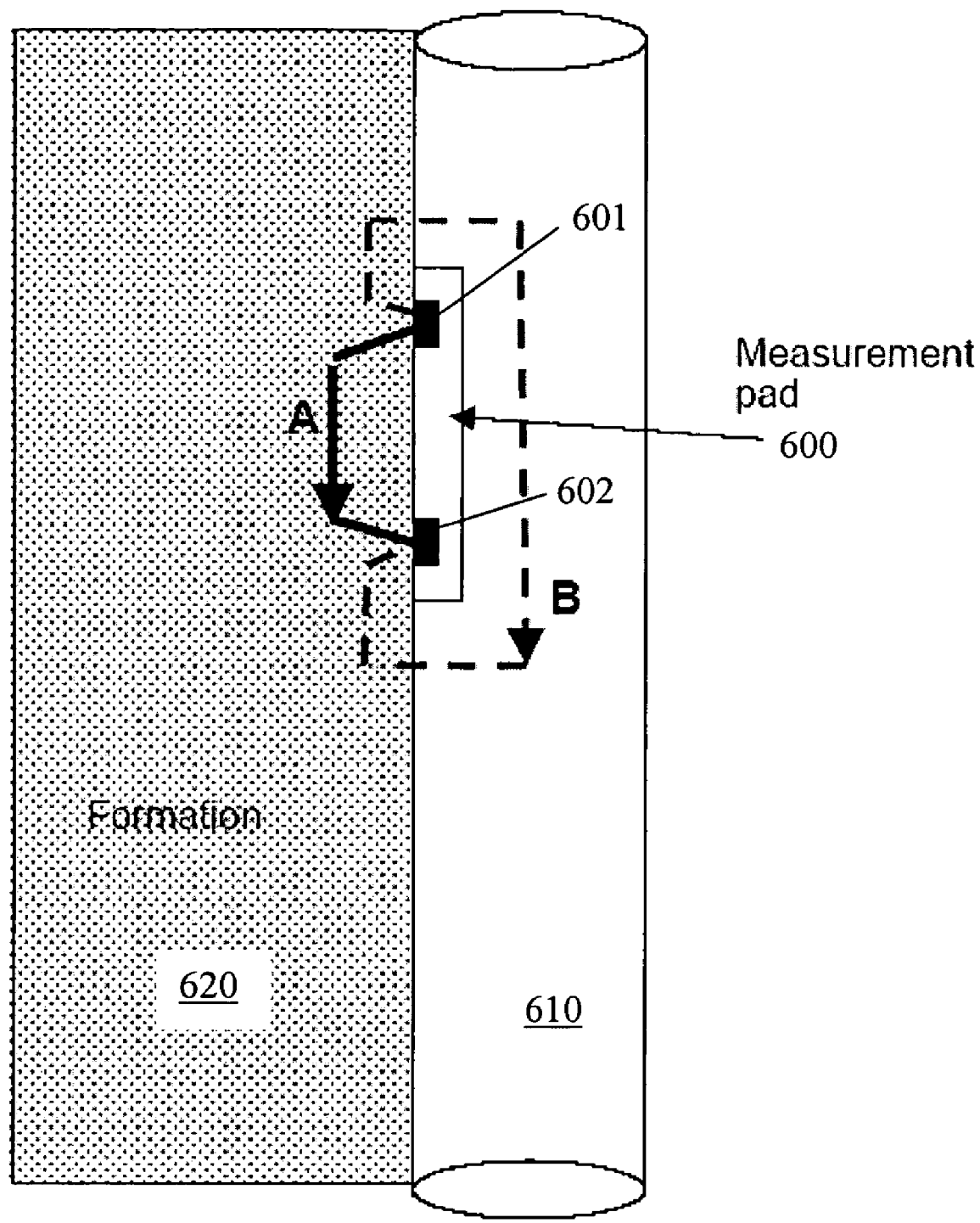
FIG. 9 illustrate two current paths for a current injected into a formation by a resistivity sensor of the invention.

The other factor that affects the efficiency of the measurement electrodes concerns the current path. The current injected into the formation should pass in front of the measurement electrodes, rather than through the conductive drill string or tool body. FIG. 9 illustrates two conductive paths for the injected current to return to the return electrode. As shown, the drilling assembly 610 having a sensor of the invention 600 is pressed against a formation 620. The current injected from the current injection electrode 601 can travel via path A back to the current return electrode 602, or via path B to the current return electrode 602. Note that the two paths A and B are for illustration only and not intended to limit the scope of the invention.

As shown in FIG. 9, the current returning via path A passes in front of the measurement electrodes 603, allowing the measurement electrodes 603 to obtain signals related to the formation resistivity in front of them. In contrast, the current returning via path B does not pass in front of the measurement electrodes 603. Therefore, current returning via path B does not produce formation signals at the measurement electrodes 603. Accordingly, means should be provided to reduce or eliminate the short circuit provided by path B.

Figure 10:
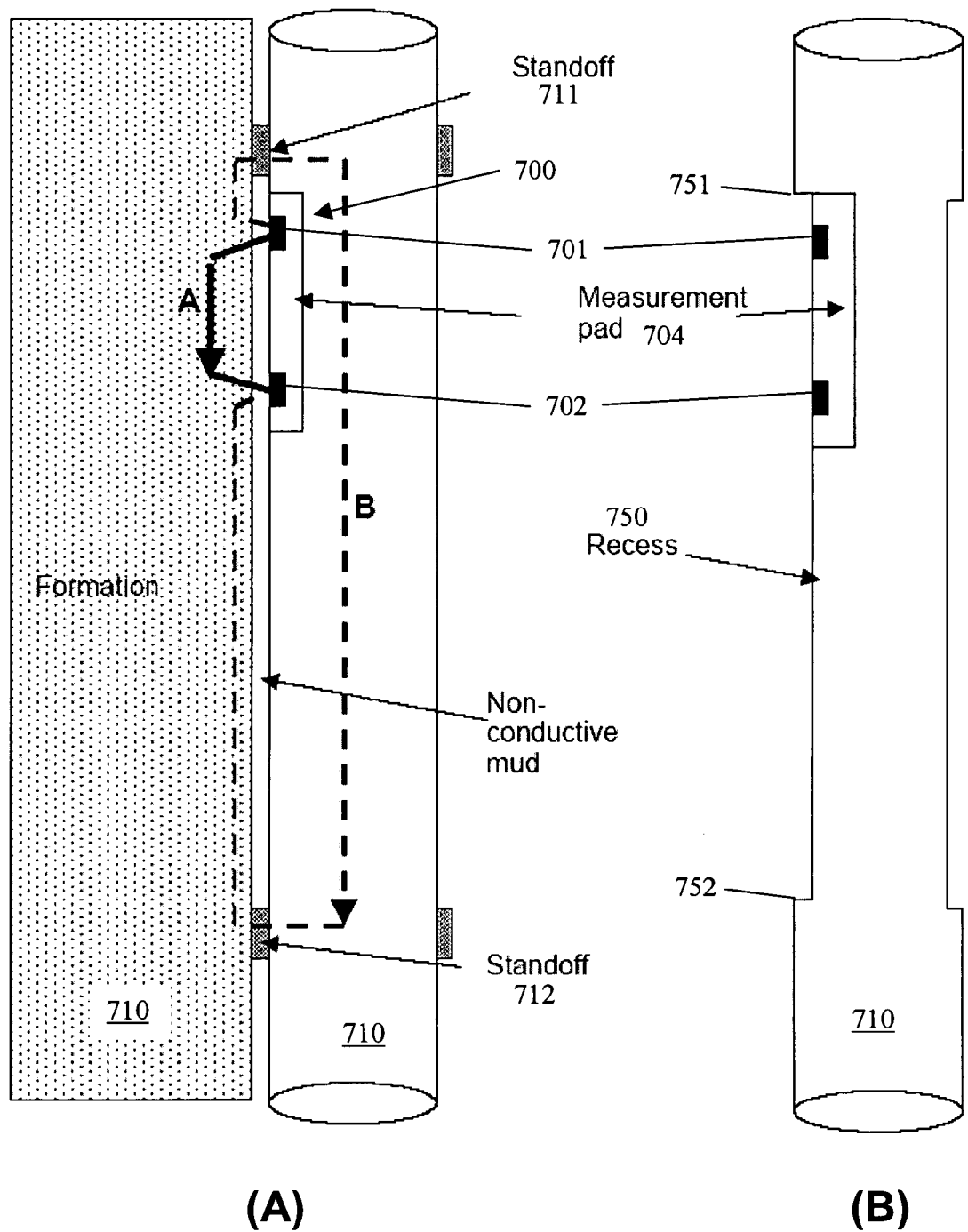
FIGS. 10A and 10B illustrate methods for preventing short circuiting the measurement current path using a tool according to one embodiment of the invention.

FIG. 10A illustrates one embodiment of the invention that can prevent the conductive tool body or the conductive pad from short circuiting the normal current path A. At the same time, the tool body and the conductive pad are allowed to be grounded to the formation potential at a location near the measurement electrodes. As shown, the conductive tool body (or drill string) 710 and the conductive pad 704, if used, do not contact the formation. Instead, standoff bands 711 and 712 contact the borehole wall. At least one of the standoff bands 711 and 712 is preferably made of a conductive material to provide a conductive link to allow the conductive pad 704 (or a backplate) to maintain a potential that is substantially identical to the formation potential. If both standoff bands 711 and 712 are conductive, the contacts would allow the current to flow along path B. In this case, it is preferred that the distance between the standoff bands 711 and 712 are large relative to the length of the conductive pad. For example, if the distance between the standoff bands 711 and 712 are at least twice the length of the conductive pad, then the current flowing along path B will probably be substantially less than the current flowing along path A.

FIG. 10B shows an alternative embodiment to that shown in FIG. 10A. As shown in FIG. 10B, a recess 750 is created in the tool body 710 such that the pad 704, together with the electrodes, will not directly contact the borehole wall. When this tool is pressed against the borehole wall, a layer of the non-conductive mud will remain between the pad 704 and the borehole wall. This layer of non-conductive mud will provide the insulation. Therefore, only the sections of the tool body above and below the recess contact the borehole wall to provide the grounding. Note that the distance between the top edge 751 and the bottom edge 752 of the recess 750 should be large relative to the length of the pad 704 so as to minimize short circuiting the desired current (shown as path A in FIG. 10A). One of ordinary skill in the art would appreciate that variations of the embodiments shown in FIGS. 10A and 10B are possible. For example, an alternative to the embodiment shown in FIG. 10B is to include an insulating material in the recess 750 shown in FIG. 10B.

A pending published U.S. patent application No. 2003/0173968 A1 by Cheung et al. discloses methods for accurately deriving resistivities of a formation when a layer of non-conductive mud is disposed between the sensor and the wall of the borehole. This application is assigned to the assignee of the present invention and is hereby incorporated by reference in its entirety.

Some embodiments of the invention have sensors on rotating parts of a drilling assembly. If the sensor rotates with the drill string, then a borehole image may be obtained with a single sensor, which may include a pair (or more) of the measurement electrodes (shown as 6 in FIG. 1). Some embodiments of the invention have sensors on non-rotating pads of a drilling assembly. If the sensors are disposed on non-rotating pads (or fins), then several sensors should be disposed on pads that are arranged around the circumference of the tool body. The orientation (azimuthal direction) and the measurement depth of the sensors may be determined by known conventional methods in order to construct borehole images.

Figure 11:
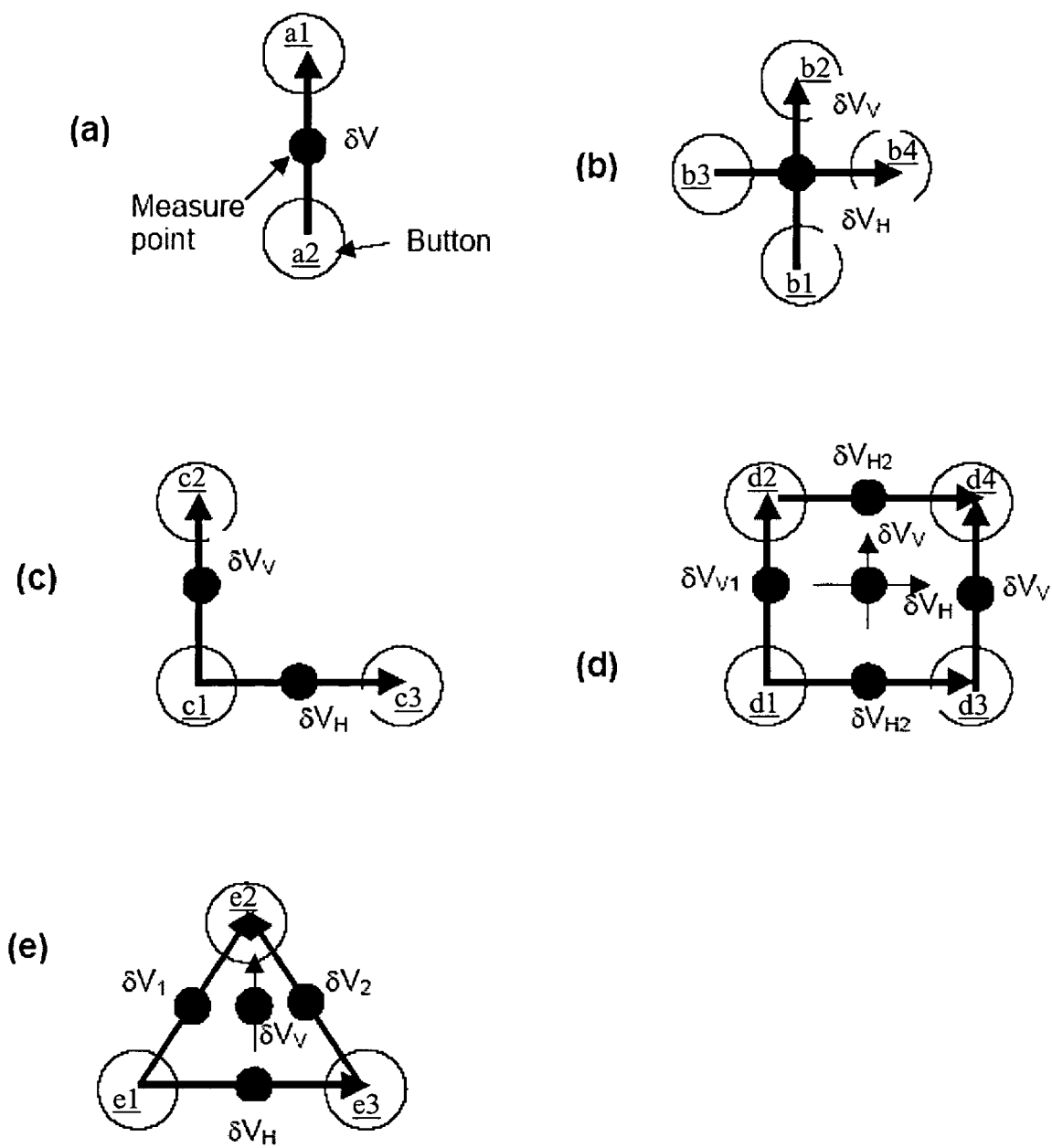
FIGS. 11a–11e show configurations of measurement electrodes according to some embodiments of the invention.

Whether disposed on a rotating or non-rotating part of a tool, a sensor of the invention may have measurement electrodes arranged in various configurations. FIGS. 11a–11e illustrate five different measurement electrode configurations that may be used with a sensor of the invention. FIG. 11a shows a simple two-button arrangement that includes buttons a1 and a2. This configuration can measure only the "apparent" vertical electrical field; it cannot provide sufficient information to derive the actual direction and magnitude of the electrical field.

In order to detect the magnitude and direction of an electrical field, more than two button electrodes are required. These electrodes are preferably arranged to provide measurements in substantially orthogonal directions as disclosed in U.S. Pat. No. 6,191,588 B1 issued to Chen. FIG. 11b shows one configuration involving four electrodes. One pair of the electrodes, b1 and b2, are arranged to measured the electrical field in the vertical direction ($\delta V_V$), while the other pair, b3 and b4, are arranged to measure the electrical field in the horizontal direction ($\delta V_H$). Note that the vertical and horizontal directions as used herein are only for illustration. One of ordinary skill in the art would appreciate that these directions may not be aligned with the true vertical or true horizontal directions. The relative magnitudes of $\delta V_V$ and $\delta V_H$ is a function of the actual electrical field direction and magnitude. Thus, the direction and magnitude of the electric field may be derived from the $\delta V_V$ and $\delta V_H$ measurements.

FIG. 11c illustrates a configuration in which three electrodes c1, c2, and c3, are arranged to provide measurements of $\delta V_V$ and $\delta V_H$. Note that the average positions of the $\delta V_V$ and $\delta V_H$ measurements obtained with the sensor shown in FIG. 11c are different. The vertical measurement $\delta V_V$ is obtained at a position displaced by half the button spacing horizontally and the horizontal measurement $\delta V_H$ is obtained at a position displaced by half the button spacing vertically. Accordingly, in preferred embodiments, the $\delta V/I$ values used to construct the borehole image will need to be shifted in measurement depth and azimuth. Thus, the sensor of FIG. 11c is less preferred than that shown in FIG. 11b. However, the measurements may also be used without correction for position shifts because the electrode spacing may be on the order of 1 inch or less, and, therefore, the positional displacement may be ignored in some applications.

FIG. 11d illustrates a configuration in which four electrodes, d1, d2, d3, and d4, are arranged to provide two measurements in the vertical direction, $\delta V_{V1}$ and $\delta V_{V2}$, and two measurements in the horizontal direction, $\delta V_{H1}$ and $\delta V_{H2}$. The $\delta V_{V1}$ and $\delta V_{V2}$ measurements may be used to calculate an average measurement in the vertical direction:

$$\delta V_V = \frac{1}{2}(\delta V_{V1} + \delta V_{V2}).$$

Similarly, the $\delta V_{H1}$ and $\delta V_{H2}$ measurements may be used to calculate an average measurement in the horizontal direction:

$$\delta V_H = \frac{1}{2}(\delta V_{H1} + \delta V_{H2}).$$

As shown in FIG. 11d, the average positions of the computed $\delta V_V$ and $\delta V_H$ are at the center of the square cornered by the four electrodes. Thus, this sensor configuration provides similar results as that of FIG. 11b.

FIG. 11e show another sensor configuration in which three electrodes, e1, e2, and e3, are arranged in a triangle, preferably an equilateral triangle. With this configuration, the vertical measurement ($\delta V_V$) is obtained by averaging the two measurements ($\delta V_{V1}$ and $\delta V_{V2}$) obtained with diagonal electrode pair, e1 and e2, and diagonal electrode pair, e3 and e2, respectively. That is, $$\delta V_V = \frac{1}{2}(\delta V_{V1} + \delta V_{V2}).$$

The horizontal measurement $\delta V_H$ may be obtained from the electrode pair, e1 and e3, or from the difference between the two measurements obtained with the diagonal pairs of electrodes ($\delta V_{V1}$ and $\delta V_{V2}$). That is, $$\delta V_H = \delta V_{V2} - \delta V_{V1}.$$

Note that the average positions of the $\delta V_V$ and $\delta V_H$ do not coincide, with the horizontal measurement $\delta V_H$ obtained at a position displaced by half the button spacing vertically. Accordingly, the $\delta V/I$ values used to construct the borehole image may need to be shifted in measurement depth. However, in some applications, the positional shifts may not be significant and can be ignored.

As noted above, sensors of the invention may be deployed on a rotating part of a drilling assembly, preferably on articulated pads on a button-hole assembly. The articulated pads can push the sensors against the borehole wall to facilitate the measurements and to minimize or eliminate tool standoff effects. Deployable pads have been extensively used in wireline tools to minimize logging tool standoffs and to maximize and maintain sensor contact with the borehole wall. The use of deployable pads in LWD or MWD tools is rare due to the harsh conditions encountered during drilling. Recently, there have been some development in the deployable pads for use in LWD tools. One or ordinary skill in the art would appreciate that sensors of the invention may be used with any deployable pad, whether currently known or yet to be developed.

Figure 12:
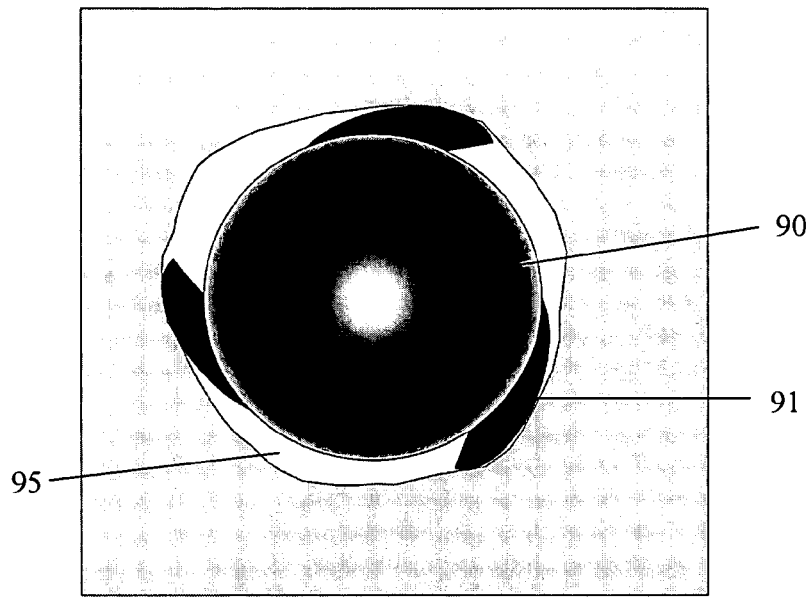
FIGS. 12A and 12B show a PowerDrive™ tool having deployable pads that may be used with sensors of the invention.
Figure 12:
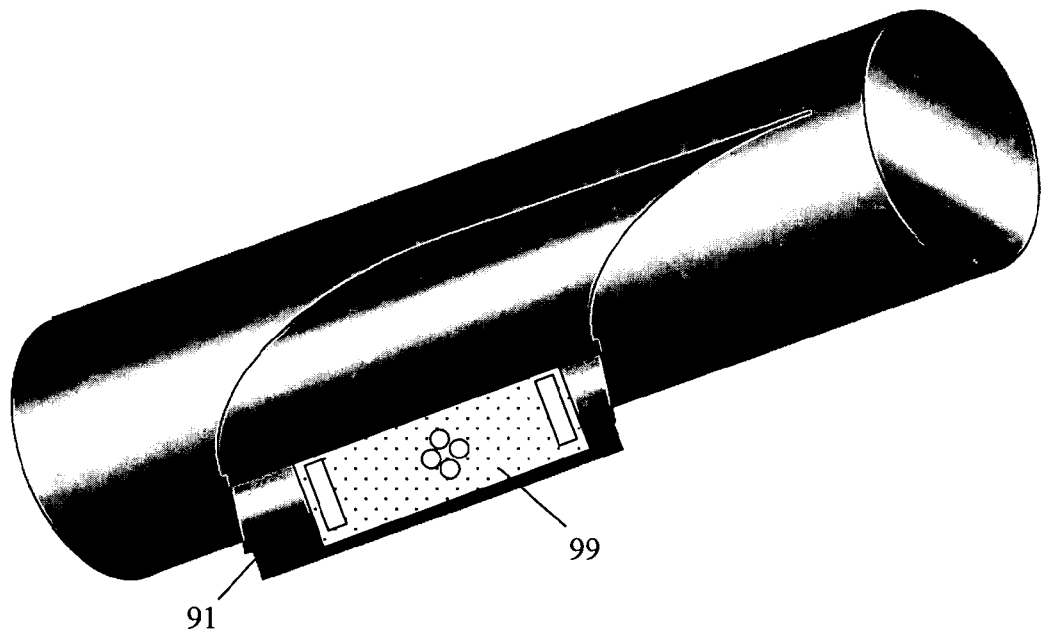

One example of a deployable pad can be found on a PowerDrive™ tool recently introduced by Schlumberger Technology Corporation (Houston, Tex.). The PowerDrive™ tools include hydraulically controlled pads that may be used to steer the drill bit by a push-the-bit mechanism. FIG. 12A shows a cross sectional view of a collar equipped with three PowerDrive™ pads 91 disposed on a PowerDrive™ tool 90 that is in the process of drilling a borehole 95. The deployable pads on a PowerDrive™ tool may be used to include sensors for formation property measurements. For example, FIG. 12B shows a sensor in accordance with one embodiment of the invention disposed on one of the PowerDrive™ pads.

Another example of a deployable pad is disclosed in a co-pending U.S. patent application Ser. No. 10/605200 by Homan et al., which discloses pressure-compensated pads (piston-like mechanism) for use in LWD or MWD logging tools. These extendable pads may also be used with embodiments of the invention. Note that embodiments of the invention are not limited by the types of deployable pads used.

As noted above, some embodiments of the invention include the above-described sensors on a non-rotating sleeve (pads) on a drilling assembly. Various non-ratting pads are known in the art. For example, U.S. Pat. No. 6,230,557 B1 issued to Ciglenec et al. discloses apparatus and methods for including pressure measurement sensors on non-rotating sleeves. This patent is assigned to the assignee of the present invention and is hereby incorporated by reference in its entirety.

Figure 13:
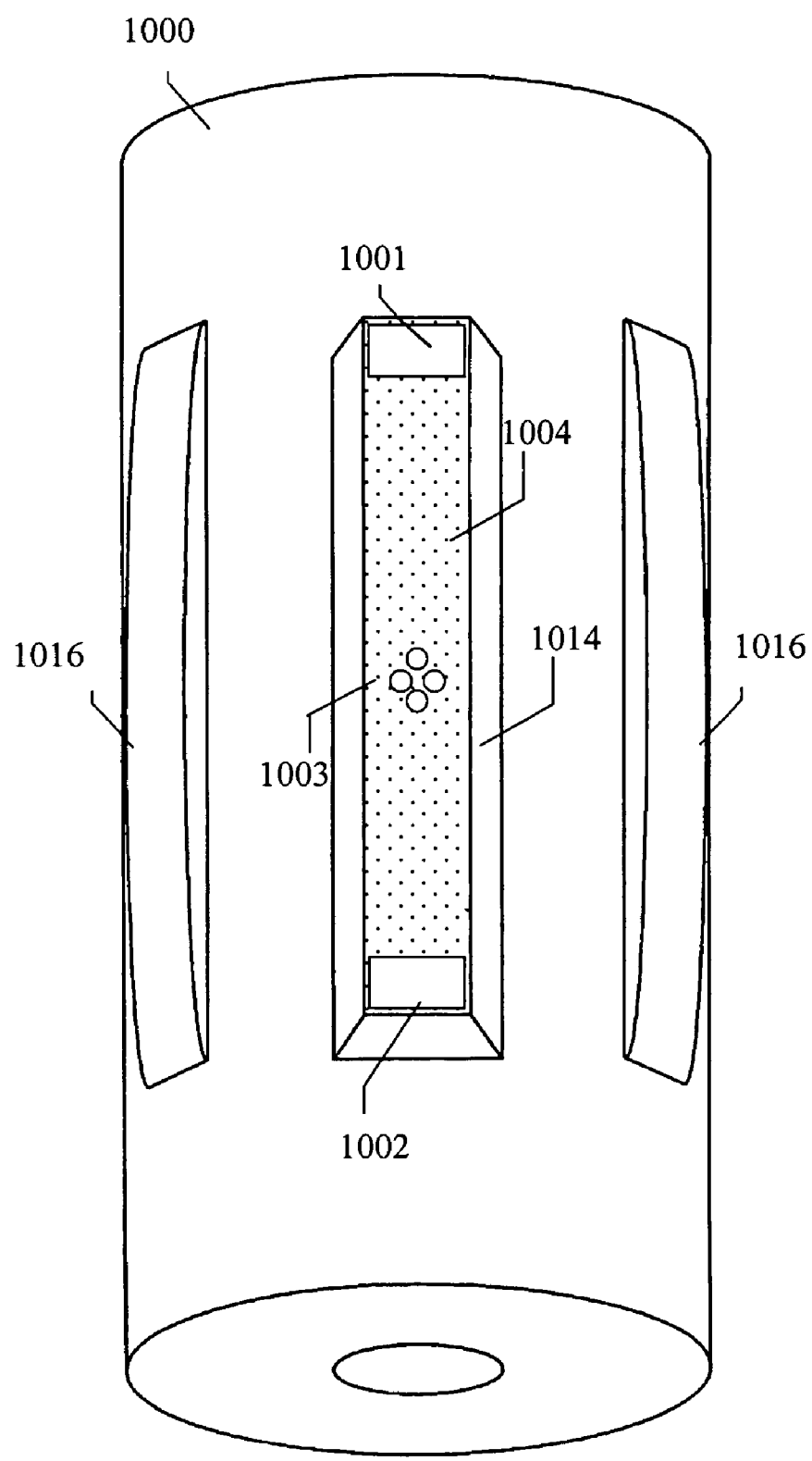
FIG. 13 shows an example of a non-rotating sleeve for use with a sensor according to one embodiment of the invention.

FIG. 13 shows on example of a non-rotating sleeve including a sensor of the invention. As shown, a non-rotating sleeve 1000 comprises a plurality of stabilizer blades 1016 and one or more rib 1014. A sensor of the invention may be included on a rib 1014. As shown in this example, an insulating pad 1004 is disposed on the rib 1014. On the insulating pad are disposed a current injection electrode 1001, a current return electrode 1002, and a sect of measurement electrodes 1003. The rib 1014 may include an articulating mechanism (not shown) to push the rib against the borehole wall. The articulating mechanism may be based on hydraulic pressure, spring, etc. Other non-rotating sleeve/pad examples may be found in U.S. Pat. No. 6,564,883 issued to Fredericks et al., in U.S. Pat. No. 6,600,321 B2, issued to Evans, and in U.S. Pat. No. 6,173,793 issued to Thompson et al.

The non-rotating pads or sleeves may be made substantially non-rotating by any mechanism know in the art. For example, the pad may be forced against the borehole wall by an articulating mechanism powered by mechanical force (e.g., spring) or hydraulic pressure. The frictional force between the pads and the borehole wall keeps the pads from rotating (or substantially reduces its rotation). Alternatively, the pad may be made substantially non-rotating by imparting a rotation at substantially the same rate, but in an opposite direction, as the rotation of the drill string. This "counter rotation" may be achieved using a mud motor, for example.

Advantages of the invention may include one or more of the following. Embodiments of the invention can be used to image a well while drilling using a non-conductive mud. The resistivity sensors of the invention include conductive backplates or shields or use conductive pads to reduce the interference from the injection electrodes when using a relatively high frequencies. Furthermore, the conductive backplates or shields or the conductive pads are preferably maintained at a potential that is substantially the same as the formation potential in front of the measurement electrodes to minimize adverse effects due to uneven standoffs. The sensors of the invention may be used on a rotating part or a non-rotating part of the drilling assembly.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A resistivity tool for investigating a wall of a borehole drilled with a non-conductive mud, comprising:
   a tool body adapted to be incorporated in a logging-while-drilling tool assembly having a conductive body;
   a resistivity sensor disposed on the tool body, wherein the resistivity sensor comprises a sensor pad disposed in the tool body supporting a current injector electrode, a current return electrode, and an array of measurement electrodes; and
   a circuitry for controlling current injection from the current injector electrode and for measuring voltage difference between electrodes in the array of measurement electrodes, wherein the array of measurement electrodes is disposed between the current injector electrode and the current return electrode, wherein the sensor pad is constructed of an insulating material and includes a conductive member disposed in the tool body and insulated from the conductive body of the logging-while-drilling tool assembly.

2. The tool of claim 1, wherein the conductive member in the sensor pad is configured to have a potential substantially identical to a potential of the wall of the borehole.

3. The tool of claim 1, wherein the conductive member in the sensor pad is grounded to a potential of the wall of the borehole.

4. The tool of claim 1, wherein the resistivity sensor is disposed in a recess on the tool body such that the resistivity sensor does not touch the wall of the borehole when the tool body is pressed against the wall of the borehole.

5. The tool of claim 4, wherein a length of the recess is at least twice a length of the sensor pad along a longitudinal axis of the tool body.

6. The tool of claim 1, wherein the tool body comprises two standoff bands such that the resistivity sensor does not touch the wall of the borehole when the tool body is pressed against the wall of the borehole.

7. The tool of claim 1, wherein the resistivity sensor is disposed on a part of the tool body that does not rotate with a drill string during a drilling operation.

8. The tool of claim 1, wherein the resistivity sensor is disposed on a part of the tool body that rotates with a drill string during a drilling operation.

9. The tool of claim 1, wherein the array of measurement electrodes are configured to provide formation voltage measurements in two substantially orthogonal directions.

10. A resistivity tool for investigating a wall of a borehole drilled with a non-conductive mud, comprising:
    a tool body adapted to be incorporated in a logging-while-drilling tool assembly;

a resistivity sensor disposed on the tool body, wherein the resistivity sensor comprises a conductive sensor pad supporting a current injector electrode, a current return electrode, and an array of measurement electrodes, wherein the current injector electrode, the current return electrode, and the array of measurement electrodes are insulated from the conductive sensor pad; and a circuitry for controlling current injection from the current injector electrode and for measuring voltage difference between electrodes in the array of measurement electrodes, wherein the array of measurement electrodes is disposed between the current injector electrode and the current return electrode;

wherein the conductive sensor pad is configured to have a potential substantially identical to a potential of the wall of the borehole.

11. The tool of claim 10, wherein the conductive sensor pad is grounded to a potential of the wall of the borehole.

12. The tool of claim 10, wherein the resistivity sensor is disposed in a recess on the tool body such that the resistivity sensor does not touch the wall of the borehole when the tool body is pressed against the wall of the borehole.

13. The tool of claim 12, wherein a length of the recess is at least twice a length of the sensor pad along a longitudinal axis of the tool body.

14. The tool of claim 10, wherein the tool body comprises two standoff bands such that the resistivity sensor does not touch the wall of the borehole when the tool body is pressed against the wall of the borehole.

15. The tool of claim 14, wherein at least one of the two standoff bands is constructed of a conductive material to provide a conductive link for grounding the conductive member in the sensor pad to a formation potential.

16. The tool of claim 10, wherein the resistivity sensor is disposed on a deployable pad on a tool body.

17. The tool of claim 10, wherein the resistivity sensor is disposed on a part of the tool body that does not rotate with a drill string during a drilling operation.

18. The tool of claim 10, wherein the resistivity sensor is disposed on a part of the tool body that rotates with a drill string during a drilling operation.

19. The tool of claim 10, wherein the array of measurement electrodes are configured to provide formation voltage measurements in two substantially orthogonal directions.

20. The tool of claim 10, wherein the conductive sensor pad is insulated from the tool body.

* * * * *